(12) United States Patent
Bonilla et al.

(10) Patent No.: US 11,502,525 B2
(45) Date of Patent: Nov. 15, 2022

(54) DISTRIBUTED CHARGING STATION AND METHOD OF MANAGING THE SAME

(71) Applicant: Hubbell Incorporated, Shelton, CT (US)

(72) Inventors: Nelson Bonilla, Shelton, CT (US); Jason Walker, Bethany, CT (US); John Brower, Fairfield, CT (US); Nicole Gay, Thomaston, CT (US); Matthew Samojeden, Rye, NY (US); Shadi AbuGhazaleh, Guilford, CT (US)

(73) Assignee: Hubbell Incorporated, Shelton, CT (US)

( * ) Notice: Subject to any disclaimer, the term of this patent is extended or adjusted under 35 U.S.C. 154(b) by 127 days.

(21) Appl. No.: 16/288,777

(22) Filed: Feb. 28, 2019

(65) Prior Publication Data
US 2019/0267812 A1 Aug. 29, 2019

Related U.S. Application Data

(60) Provisional application No. 62/702,511, filed on Jul. 24, 2018, provisional application No. 62/636,469, (Continued)

(51) Int. Cl.
*H02J 7/00* (2006.01)
*H02J 50/10* (2016.01)
(Continued)

(52) U.S. Cl.
CPC .......... *H02J 7/0045* (2013.01); *H02J 7/0013* (2013.01); *H02J 7/00036* (2020.01);
(Continued)

(58) Field of Classification Search
CPC ....................................................... H02J 7/00
See application file for complete search history.

(56) References Cited

U.S. PATENT DOCUMENTS

| 2005/0110639 A1 | 5/2005 | Puzio et al. |
| 2010/0259213 A1 | 10/2010 | Maharaj |

(Continued)

FOREIGN PATENT DOCUMENTS

| CN | 103226184 | * | 7/2013 |
| CN | 203205893 | * | 9/2013 |

(Continued)

OTHER PUBLICATIONS

PCT/US2019/019997 International Search Report and Written Opinion dated May 13, 2019 (17 pages).

(Continued)

*Primary Examiner* — Robert Grant
(74) *Attorney, Agent, or Firm* — Michael Best & Friedrich LLP

(57) ABSTRACT

A battery management system including a battery center and a controller. The battery center includes one or more battery receptacle. The battery center is configured to: receive one or more batteries, identify one or more batteries, and charge one or more batteries. The controller includes a memory and an electronic processor. The controller is configured to: receive, from the battery center, a status of one or more batteries, receive, from a user, an unlock request, and output, to the battery center, an unlock command. Wherein, the battery center unlocks one or more batteries from the one or more battery receptacle upon receiving the unlock command.

17 Claims, 11 Drawing Sheets

Related U.S. Application Data filed on Feb. 28, 2018, provisional application No. 62/636,454, filed on Feb. 28, 2018.

(51) Int. Cl.
*H02J 50/90* (2016.01)
*H02J 13/00* (2006.01)
*H01M 10/42* (2006.01)

(52) U.S. Cl.
CPC ........ *H02J 7/00038* (2020.01); *H02J 7/0047* (2013.01); *H02J 13/00001* (2020.01); *H02J 50/10* (2016.02); *H02J 50/90* (2016.02); *H01M 10/4257* (2013.01); *H02J 7/0048* (2020.01)

(56) References Cited

U.S. PATENT DOCUMENTS

| | | | |
|---|---|---|---|
| 2011/0145086 A1 | 6/2011 | Valdes et al. | |
| 2011/0234153 A1 | 9/2011 | Abramson | |
| 2012/0249051 A1 | 10/2012 | Son et al. | |
| 2013/0026981 A1* | 1/2013 | Van Der Lee | H04B 5/0075 320/108 |
| 2013/0279206 A1 | 10/2013 | Yang | |
| 2014/0053620 A1 | 2/2014 | Taylor et al. | |
| 2015/0357684 A1* | 12/2015 | Willgert | H02J 7/0025 320/112 |
| 2016/0088482 A1* | 3/2016 | Zeiler | B25F 5/00 455/426.1 |
| 2016/0099590 A1* | 4/2016 | Velderman | H02J 7/0045 320/113 |
| 2016/0156207 A1 | 6/2016 | Frankenberger | |
| 2018/0375349 A1 | 12/2018 | Bonilla et al. | |

FOREIGN PATENT DOCUMENTS

| | | | |
|---|---|---|---|
| CN | 103853672 | * | 6/2014 |
| CN | 106056777 | * | 10/2016 |
| CN | 106182009 | * | 12/2016 |
| CN | 106204938 | * | 12/2016 |
| CN | 205827534 | * | 12/2016 |
| CN | 205862456 | * | 1/2017 |
| CN | 107301733 | * | 10/2017 |
| CN | 107393177 | * | 11/2017 |
| CN | 107437836 | * | 12/2017 |

OTHER PUBLICATIONS

European Patent Application No. 19761370.6 extended European search report and European search opinion dated Dec. 7, 2021.

* cited by examiner

DISTRIBUTED CHARGING STATION AND METHOD OF MANAGING THE SAME

RELATED APPLICATIONS

This application claims the benefit to U.S. Provisional Patent Application No. 62/636,454, filed on Feb. 28, 2018, U.S. Provisional Patent Application No. 62/636,469, filed on Feb. 28, 2018, and U.S. Provisional Patent Application No. 62/702,511, filed on Jul. 24, 2018, the entire contents all of which are incorporated herein by reference.

FIELD

Embodiments relate to portable power supplies.

SUMMARY

Portable power supplies (for example, battery charging modules, mobile power modules, etc.) may need to be tracked to ensure that they do not get lost or stolen. To further ensure that the portable power supplies are tracked and maintained properly, a platform may be used.

Accordingly, the one embodiment provides a battery management platform for one or more batteries configured to supply power to at least one load device and a central charging station in communication with the battery(s) associated with the central charging station. The battery management platform includes a battery configured to supply a type of power to at least one load device and a central charging station configured to provide power to charge the battery while the battery is coupled to the central charging station. The central charging station includes an electronic processor configured to secure the battery to the central charging station via a locking mechanism when a status of the battery is determined to be checked-in; receive, via a graphic user interface, a user request to check-out the battery; and update, in a memory, a status of the battery as checked-out. The electronic processor is further configured to disengage, when the status is changed to checked-out, the locking mechanism to allow the battery to be removed; monitor at least one characteristic of the battery while the battery is checked-out; determine, when the status is checked-out; when the battery is recoupled to the central charging station, update, in the memory, the status of the battery as checked-in; and engage, when the status is changed to checked-in, the locking mechanism to secure the battery to the central charging station.

Another embodiment provides a battery management system including a battery center and a controller. The battery center includes one or more battery receptacle. The battery center is configured to: receive one or more batteries, identify one or more batteries, and charge one or more batteries. The controller includes a memory and an electronic processor. The controller is configured to: receive, from the battery center, a status of one or more batteries, receive, from a user, an unlock request, and output, to the battery center, an unlock command. Wherein, the battery center unlocks one or more batteries from the one or more battery receptacle upon receiving the unlock command.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. For ease of description, some or all of the example systems presented herein are illustrated with a single exemplar of each of its component parts. Some examples may not describe or illustrate all components of the systems. Other exemplary embodiments may include more or fewer of each of the illustrated components, may combine some components, or may include additional or alternative components. The application is capable of other embodiments and of being practiced or of being carried out in various ways.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
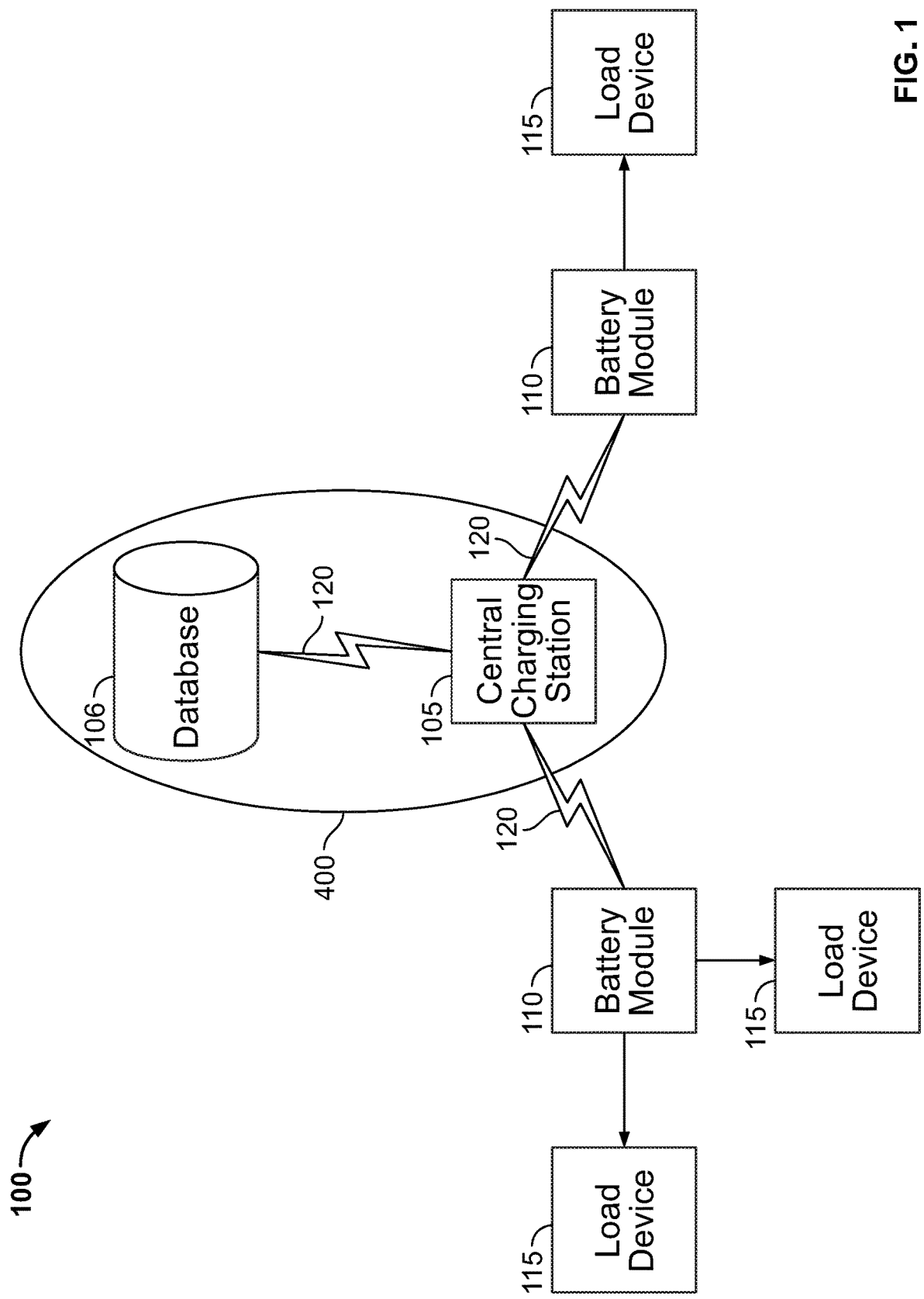
FIG. 1 illustrates a diagram of an example charging system according to some embodiments.

FIG. 1 illustrates a diagram of an example charging system 100 and a battery management platform 400 according to some embodiments. The charging system 100 may include a central charging station 105, one or more batteries 110, and one or more load devices 115 coupled to the one or more batteries 110. The central charging station 105 is configured to communicate with the batteries 110, for example via communication links 120. As described in more detail with respect to FIG. 4, the battery management platform 400 (FIG. 4) includes the central charging station 105 and, in some embodiments, one or more databases 106. In some embodiments, the one or more databases 106 may be locally stored within the central charging station 105. As explained in more detail below, the battery management platform 400 is configured to track and maintain the one or more batteries 110 associated with the charging station 105.

The batteries 110 supply power to the one or more load devices 115 coupled to the respective battery 110 while within a virtual boundary managed by the battery management platform 400. In some embodiments, when the management platform 400 determines that one of the batteries 110 is outside the virtual boundary, the management platform 400 transmits an electronic command to the battery 110 for the battery 110 to stop powering the load devices 115 that the battery 110 is coupled to. In other words, the management platform 400 is configured to detect when a battery 110 leaves the virtual boundary and command the battery 110 to become non-operational (for example, prohibit the supply of power to a load device 115).

As illustrated in FIG. 1, to provide the services described herein, the battery management platform 400 may utilize the database 106 for data storage. The database 106 may be a database housed on a suitable database server communicatively coupled to and accessible by the central charging station 105. In alternative embodiments, the database 106 is part of a cloud-based database system external to the system 100 and accessible by the central charging station 105 over one or more additional networks. Also, in some embodiments, all or part of the database 106 is locally stored on the central charging station 105.

Although the functions associated with the battery management platform 400 are described herein as being performed on the central charging station 105, it should be understood that, in some embodiments, the battery management platform 400 may also include one or more servers (not shown), which may be located remotely. The server may communicate with the central charging station 105 and the database 106 to perform some or all of the functions of the battery management platform 400.

In some embodiments, as described in more detail below, the database 106 electronically stores battery profile data and, in some embodiments, user profile data. It should be understood that, in some embodiments, the data stored in the database 106 is distributed among multiple databases that communicate with the central charging station 105.

The battery profile data includes battery identifiers, which are unique to and associated with individual batteries 110. The battery profile data may include battery identifiers, a location history of the battery 110, a user history of the battery 110, a maintenance history of the battery 110, a usage history of the battery 110 (for example, battery percentage, check in/out times, time in use), and additional information related to each battery 110.

The user profile data includes user profiles, which are unique to and associated with individual users of the battery (s) 110. For example, the user profiles may include user account information, security permissions, (for example, file or application permissions), battery preferences and history (for example, the batteries 110 previously "checked-out" by the user), and/or personal information (for example, name, email addresses, phone numbers, and the like) for the user.

In some embodiments, one or more of the user profiles may be associated with one or more operators of the central charging station 105. The operators may have an authorization level associated with them that allow them to perform administrative tasks normal users may not be able to perform. An operator/authorized user may be able to, for example, define and adjust the virtual boundary of the central charging station 105, install or remove additional batteries 110 to and from the central charging station 105, remotely command one or more batteries 110 to stop supplying power to or charging the load devices 115 coupled to them, clear a malfunction alert, and the like.

Figure 2:
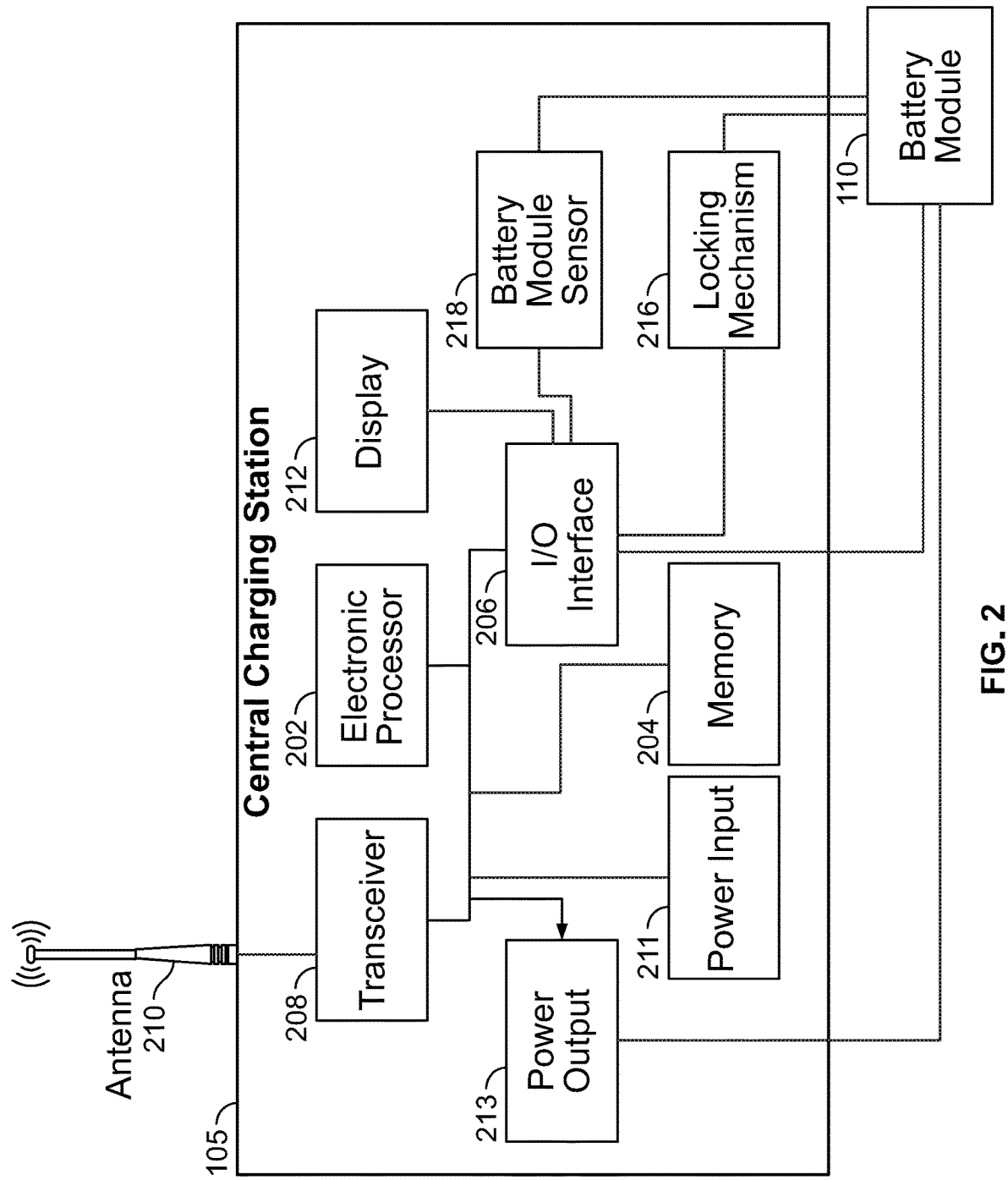
FIG. 2 illustrates a diagram of a central charging station of the charging system of FIG. 1 according to some embodiments.

FIG. 2 illustrates a diagram of the central charging station 105 according to some embodiments. In the embodiment illustrated, the central charging station 105 includes an electronic processor 202, a memory 204, an input and output (I/O) interface 206, a transceiver 208, an antenna 210, a power input 211, and a power output 213. In some embodiments, the central charging station 105 further includes a display 212. The illustrated components, along with other various modules and components are coupled to each other by or through one or more control or data buses that enable communication there between. The use of control and data buses for the interconnection between and exchange of information among the various modules and components would be apparent to a person skilled in the art in view of the description provided herein.

The electronic processor 202 obtains and provides information (for example, from the memory 204 and/or the input and output interface 206), and processes the information by executing one or more software instructions or modules, capable of being stored, for example, in a random access memory ("RAM") area of the memory 204 or a read only memory ("ROM") of the memory 204 or another non-transitory computer readable medium (not shown). The software can include firmware, one or more applications, program data, filters, rules, one or more program modules, and other executable instructions. In some embodiments, the electronic processor 202 and memory 204 are, or are part of, a controller.

The memory 204 can include one or more non-transitory computer-readable media, and includes a program storage area and a data storage area. The program storage area and the data storage area can include combinations of different types of memory, as described herein. The electronic processor 202 is configured to retrieve from the memory 204 and execute, among other things, some or all of the battery management platform 400 and software related to the control processes and methods described herein.

The input and output (I/O) interface 206 is configured to receive input and to provide output to peripherals. The I/O interface 206 obtains information and signals from, and provides information and signals to, (for example, over one or more wired and/or wireless connections) devices both internal and external to the central charging station 105 (for example, the database 106).

The electronic processor 202 is configured to control the transceiver 208 to transmit to and receive data from the central charging station 105 and, in some embodiments, the database(s) 106. The electronic processor 202 encodes and decodes digital data sent and received by the transceiver 208. The transceiver 208 transmits and receives radio signals to and from various wireless communications networks using the antenna 210. The electronic processor 202 and the transceiver 208 may include various digital and analog components, which for brevity are not described herein and which may be implemented in hardware, software, or a combination of both. Some embodiments include separate transmitting and receiving components, for example, a transmitter and a receiver, instead of a combined transceiver 208.

The display 212 may be any suitable display, for example, a liquid crystal display (LCD) touch screen, or an organic light-emitting diode (OLED) touch screen. In some embodiments, the display 212 may be a projector. In other embodiments, the display is, or includes, an output (for example, a video/audio output such as but not limited to a High-Definition Multimedia Interface (HDMI) output). In such an embodiment, the output may output power to an external display.

The battery management platform 400 may implement a graphical user interface (GUI) on the display 212 (for example, generated by the electronic processor 202, from instructions and data stored in the memory 204, and presented on the display 212), that enables a user to interact with the central charging station 105. In some embodiments, the graphical user interface is provided on a display of a remote device (for example a cellular telephone, a smart watch, a tablet computer, a personal digital assistant (PDA), a two-way radio, or any other electronic device, or a combination of the foregoing) through a web-based application installed on/accessed by the remote device. The graphical user interface may allow a user to view information regarding the central charging station 105 and the batteries 110 associated with the central charging station 105. Such information may include the type and charging status of the connected batteries 110 and the location of and load devices 115 coupled to the respective batteries 110. The graphical user interface may also allow an authorized user to define and adjust the virtual boundary of the central charging station 105, install or remove additional batteries 110 to and from the central charging station 105, or remotely command one or more batteries 110 to stop supplying power to or charging the load devices 115 coupled to them. The graphical user interface may allow interaction with the interface using gesture-based inputs or user-actuated switches/buttons.

The power input 211 is configured to receive an input power. In the illustrated embodiment, the power input 211 is a power plug configured to receive the input power from an electrical socket. In some embodiments, the input power is approximately 110 VAC to approximately 120 VAC. In other embodiments, the input power is approximately 210 VAC to approximately 220 VAC.

The central charging station 105 is configured to be associated with one or more batteries 110. The electronic processor 202 is configured to provide power to and communicate with the battery 110 through the I/O interface 206. The battery 110 is configured to be coupled to the central charging station 105 to be charged via a wired connection, receptacle to socket connection, or wirelessly (for example, via inductive charging). The battery 110 is also removable from the central charging station 105. When the battery 110 is removed (no longer coupled to the central charging station 105), the electronic processor 202 communicates wirelessly with the battery 110 via the transceiver 208.

Communication between the central charging station 105 and various components including the batteries 110 can occur through the communication links 120. In some embodiments, the communication links 120 is, for example, a wide area network (WAN), a transport control protocol/internet protocol (TCP/IP) based network, a cellular network, such as, for example, a Global System for Mobile Communications (or Groupe Special Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, etc.). In other embodiments, the communication links 120 is, for example, a local area network (LAN), a neighborhood area network (NAN), a home area network (HAN), or personal area network (PAN) employing any of a variety of communications protocols, such as Wi-Fi, Bluetooth, ZigBee, etc.

The central charging station 105 is configured to provide power, via power output 213, to one or more batteries 110. Although illustrated as providing power to a single battery 110, in other embodiments, the central charging station 105 is configured to provide power to two or more batteries 110. In some embodiments, the batteries 110 receive the power and charge battery 312 (FIG. 3) of the battery 110. In some embodiments, the power is supplied via a proprietary charging interface. In such embodiments, the charging interface may be wired. In some embodiments, the proprietary charging interface supplies power as well as communication. In some embodiments, the power is supplied via wireless power transmission.

In some embodiments, the central charging station 105 is configured to lock the one or more batteries 110 associated with the central charging station 105 via one or more locking mechanisms 216. The locking mechanisms 216 may be configured to be electronically locked, where the locking mechanism 216 is operated (locked and unlocked) electronically or remotely (for example, "smart locked"). When the locking mechanisms 216 are configured to be electronically locked, they may be operated via electronic commands from a user interaction through the graphic user interface on the display 212, a input device of the input and output interface 206, and/or an electronic command from a remote device (for example, a cellular telephone, a smart watch, a tablet computer, a personal digital assistant (PDA), a two-way radio, or any other electronic device, or a combination of the foregoing) received via the transceiver 208. In some embodiments, the locking mechanisms 216 may be configured to be physically engaged (required to be manually locked and unlocked via a key, a turn of a knob, or the activation of a user-actuable device in order to be operated). In some embodiments the locking mechanism 216 may utilize more than one kind of locking/latching configuration. For example, in some embodiments, the locking mechanism 216 may be configured to both physically and electronically lock, wherein, when the locking mechanism 216 is configured to override/bypass the electronic lock when physically engaged, allowing a user to unlatch one or more of the batteries 110 without an electronic command. As explained in more detail below, the battery management platform 400 is configured to electronically lock the batteries 110 to the charging station 105 via the locking mechanisms 216.

In some embodiments, the central charging station 105 may include a battery sensor 218 in (or proximate to) each of the power output port 213 (for example, within each cavity 214). The battery sensor 218 is configured to sense when one or more of the batteries 110 is present/coupled to the central charging station 105. The battery sensor 218 may be used in addition to the wireless and/or wired communication (for example, via the transceiver 208 and the I/O interface 206 and/or power output 213 respectively) between the charging station 105 and the battery(s) 110 as a separate means of determining when the battery(s) 110 is placed in the charging station 105. For example, the battery sensor 218 may be configured to read an identification label/chip (for example, a radio-frequency identification or RFID chip) of the battery 110. This secondary communication may be used by the central charging station 105 to determine if there is an issue/malfunction with the wireless/wired communication between the central charging station 105 and the battery(s) 110.

In some embodiments, the central charging station 105 (specifically, the battery management platform 400) determines whether one or more of the batteries 110 are within a defined virtual boundary or geofence. The virtual boundary or geofence is a virtual boundary superimposed on an area. The area may be the area surrounding the central charging station 105 or an area proximate to the central charging station 105. The configuration of the virtual boundary, for example the shape or the size, may be predefined or defined by a user via, for example, the user interface. In some embodiments, as explained in more detail below, the central charging station 105 is configured to collect information based on monitoring the location and status of each of the batteries 110. While the battery 110 is within the virtual boundary, the battery 110 is operable to provide power to charge the one or more load devices 115 connected to the battery 110. However when one of the batteries 110 leaves or is outside of the virtual boundary, the battery 110 prohibits power to the load devices 115 it is connected to.

In some embodiments, the central charging station 105 is configured to wirelessly charge the one or more batteries 110 while the batteries 110 are within a predetermined charging range of the central charging station 105. The batteries 110, while within this predetermined charging range, may then be wirelessly charged while charging one or more of the connected load devices 115. The predetermined charging range may be the same as or less than the range of the virtual boundary. For example, when the charging system 100 is located in a room within a commercial building, the virtual boundary may be defined to encompass the entire commercial building while the predetermined charging range is limited to a single room within the commercial building. When this is the case, a user with the battery 110 is able to charge or power a load device 115 as well as the battery 110 while within the single room of the commercial building. When the user takes the battery 110 outside the single room, leaving the predetermined charging range, the battery 110 no longer receives a wireless charge from the central charging station 105. However, the user is still able to use the battery 110 to supply power to the one or more load devices 115.

Figure 3:
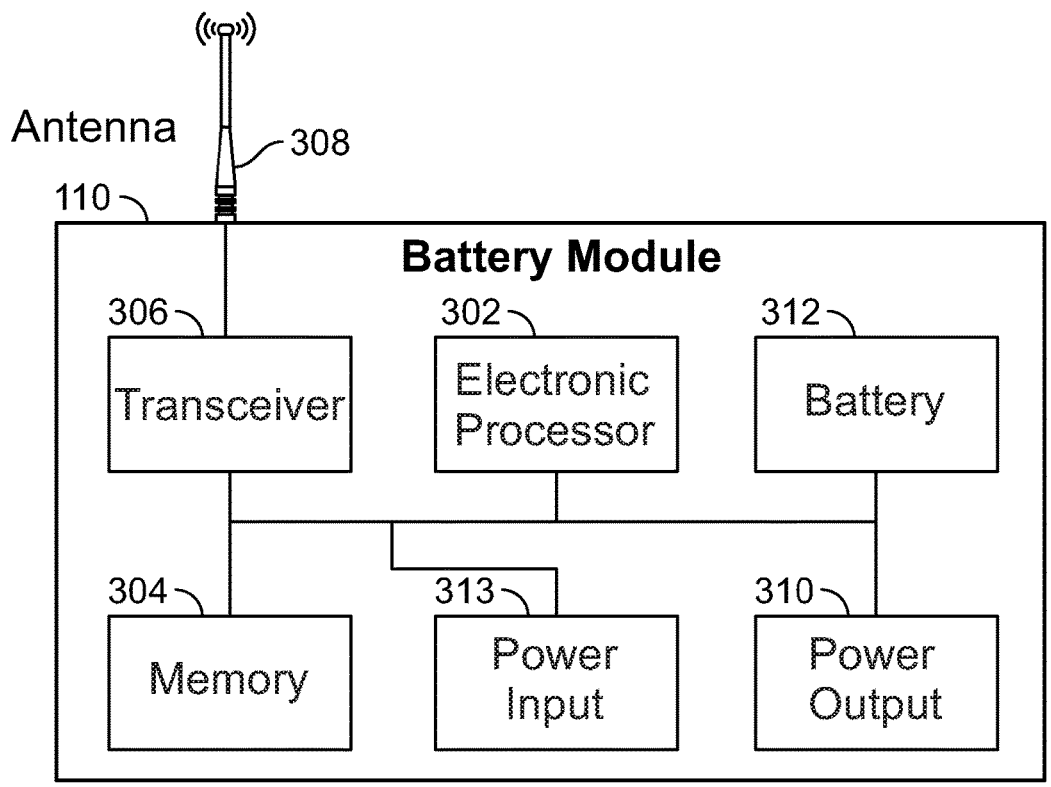
FIG. 3 illustrates a diagram of a battery of the charging system of FIG. 1 according to some embodiments.

FIG. 3 illustrates a block diagram of the battery 110 of the central charging station 105. The battery 110 may include an electronic processor 302, a memory 304, a transceiver 306, an antenna 308, at least one power output 310, a battery 312, and a power input 313.

The power output 310 is configured to connect/couple to one of the load devices 115 to supply power. In some embodiments, the power output 310 is configured to receive a power plug (for example, an alternating-current (AC) power plug and/or a Universal Serial Bus (USB) power plug). Although only one power output 310 is illustrated, it should be understood that in some embodiments the battery 110 includes more than one power output 310. In such embodiments, the power outputs are similar power receptacles configured to output similar types of power, while in other embodiments, power outputs are different power receptacles configured to output power of different types or having different characteristics (for example, different voltage amplitudes and/or magnitudes, different voltage frequencies, alternating current, or direct current). For example, one power output 310 may be a direct current power receptacle configured to output power having approximately 12 VDC, a second power output 310 may be a North American power receptacle configured to output power having approximately 120 VAC, and a third power output 310 may be a Universal Serial Bus (USB) power output configured to output approximately 5 VDC. However, in other embodiments, the power outputs may be different. In other embodiments, the battery 110 may be configured to wirelessly charge one or more of the load devices 115, for example via inductive charging.

In some embodiments the battery 110 further includes one or more of a rectifier, alternator, or other converter. The rectifier and/or alternator are configured to convert the power from the battery to an appropriate output power to be output to the one or more load device 115.

As discussed above with respect to central charging station 105, the battery 110 is configured to receive power from the central charging station 105 via the power input 313. In some embodiments, the battery 110 may include charging circuitry to receive the power from the central charging station 105 and charge the battery 312. In some embodiments, the power input 313 may be a wireless charging coil configured to wirelessly receive power and/or communicate with the central charging station 105. As mentioned above, in further embodiments, one or more of the at least one output port 310 may be a wireless charging coil configured to wirelessly transmit power to the load device(s) 115. In some embodiments, the power output 310 and power input 313 may be integrated into a single bi-directional port (or coil) configured to both transmit and receive power to and from the charging station 105 and the load device(s) 115.

The battery 110 may include one or more input/output components (not shown) similar to those described above in regard to the I/O interface 206. In some embodiments, the battery 110 is configured to generate a visual and/or audible alert to indicate a particular operational status. Such operational statuses may include a detected fault within the battery 110, the battery 312 is low on charge, or the battery 110 is outside the virtual boundary and has stopped supplying power to the load device 115. A visual indication may be provided via one or more light-emitting diodes (LEDs), a display (not illustrated), or an alarm. In some embodiments, the battery 110 may be configured to forward information regarding the particular condition to one or more external devices, for example the load device 115 or the central charging station 105.

Figure 4:
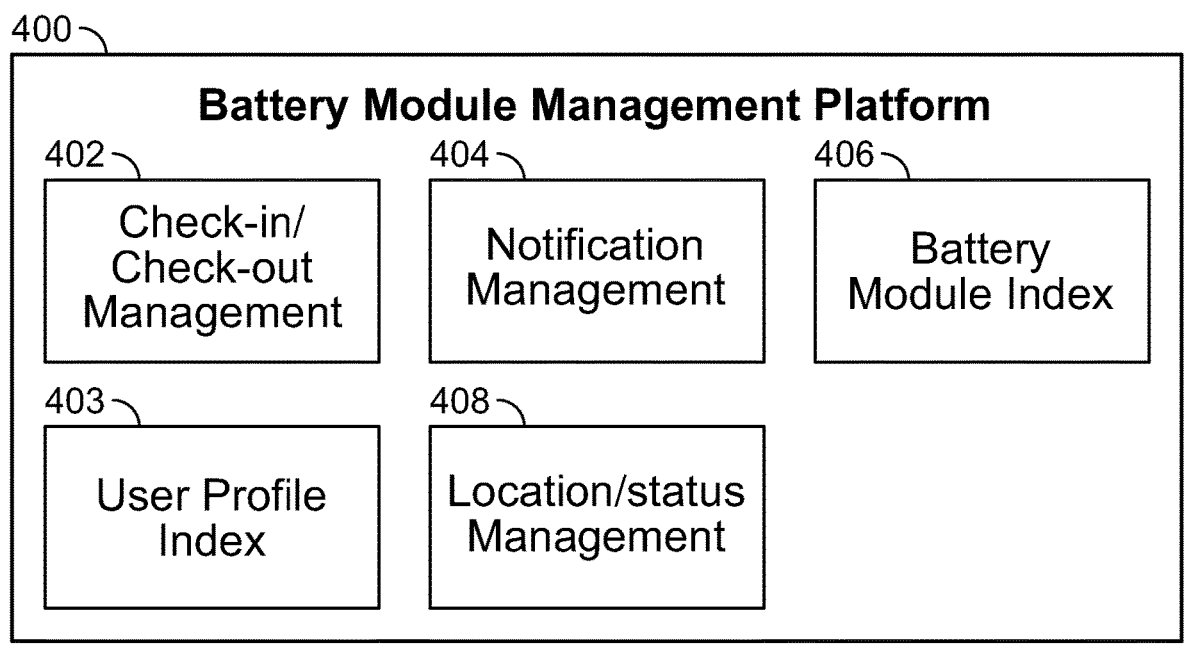
FIG. 4 illustrates a diagram of a battery management platform for the charging system of FIG. 1.

FIG. 4 is a diagram illustrating the battery management platform 400 of the charging system 100. The management platform 400 includes a check-in/check-out management module 402, a user profile index 403, a notification management module 404, a battery index 406, and a location/status management module 408. The management platform 400 is configured to perform a variety of functions, accessible via components including the I/O interface 206 and the display screen 212. In particular, the management platform 400 utilizes the components of the central charging station 105 to track and monitor the battery(s) 110 associated with the charging station 105. The functions include, for example, running local or network-based applications ("apps"), providing access to remote data networks (for example, using the long-term evolution (LTE) protocol). In some embodiments, the central charging station 105 may be configured to prevent unauthorized access to its functions by requiring user credentials including, for example, personal identification numbers, passphrases, and the like.

The management platform 400 may further be configured to communicate with an operator of the charging station 105 and the user(s) of the battery(s) 110, for example, via the graphical interface of the display 212. It should be understood that the management platform 400 may be configured to perform additional methods related to the charging system 100.

The check-in/check-out management module 402 is configured to monitor (or record) when a battery 110 is removed from the central charging station 105 ("checked-out") and when the battery 110 is returned to the central charging station 105 ("checked-in"). As explained in detail below, each of the batteries 110 associated with the central charging station 105 may be assigned a unique identifier. The identifier is subsequently used by the platform 400 to identify and manage each individual battery 110 associated with the central charging station 105. The check-in/check-out management module 402 may track which battery(s) 110 has/have been removed or checked-out based on the identifier of the battery 110.

In some embodiments, the check-in/check-out module 402 receives, via the graphical user interface, a battery request from a user. The request may be received wirelessly by the central charging station 105, for example, via the transceiver 208. In some embodiments, a user may scan the identification label of the battery 110 and transmit the identification label along with the battery request. In response, the check-in/check-out module 402 may prompt the user, via the graphical user interface, for a user profile to associate the battery 110 with. A user may enter a user identifier (for example, a username and password) associated with the user profile that the check-in/check-out module 402 may reference and update a user profile (if already stored in the user profile index 403) or add a new user profile to the user profile index 403. In further embodiments, the check-in/check-out module 402 is configured to track which battery(s) 110 have been removed based on the user profile associated with the battery(s) 110. In some embodiments, the check-in/check-out management module 402 is further configured to calculate a usage cost to charge a user of a battery based on the time in which the battery 110 is removed from the central charging station 105 to the time the battery 110 is returned to the central charging station 105 and/or the amount of charge used to power the load devices 115 coupled to the battery 110. The usage may be used by the notification management module 404 to generate a billing statement to a user of the battery 110 (for example, via an app on a personal electronic device of the user's).

The check-in/check-out module 402 may be configured to automatically determine a battery 110 as returned to the central charging station 105 (checked-in) when the currently checked-out battery 110 is coupled to the central charging station 105 via the power output 213 and/or, in some embodiments, when the battery sensor 218 senses/reads the identification label/chip of the battery 110. The check-in/check-out module 402 may then generate a usage cost to charge the user of the battery 110.

The check-in/check-out module 402 may be further configured to control the locking mechanism 216 depending on whether the battery 110 is being checked-out or has been checked-in. When the check-in/check-out module 402 determines that a battery 110 currently coupled to the central charging station 105 is to be checked-out, the check-in/check-out module 402 may change the status of the battery 110 (stored in the database 106) from checked-in to checked-out. When the status of the battery 110 is changed to checked-out, the check-in/check-out module may disengage the locking mechanism 216 to allow the particular battery 110 to be removed. Similarly, when the battery 110 is returned to the central charging station 105, the check-in/check-out module 402 may change the status of the battery 110 to checked-in and engage the locking mechanism 216 to secure the returned battery 110 to the central charging station 105 and prevent unauthorized use of the battery 110. In some embodiments, the check-in/check-out system may include sending a signal to the checked-in battery 110 instructing the battery 110 to prohibit the outputting of power to a load device 115, thereby ensuring unauthorized use of the battery 110 if the locking mechanism 216 is bypassed.

The user profile index 403 electronically stores and manages user profile data. As mentioned above, the user profile data is stored in the database 106 of FIG. 1. It should be understood that, in some embodiments, the data stored in the database 106 is distributed among multiple databases and/or servers that communicate with the central charging station 105. The user profile data includes user profiles, which are unique to and associated with individual users of the charging system 100 (FIG. 1). For example, the user profiles may include user account information, security permissions, (for example, file or application permissions), or personal information (for example, name, email addresses, phone numbers, and the like) for the user. The user profile index 403 may be configured to issue a hold on a particular user profile, preventing any batteries 110 from being checked-out under the user profile until the hold is removed. For example, when the check-in/check-out management module 402 receives a user request and determines that the user profile associated with the user who sent the request has a hold, the check-in/check-out management module 402 may maintain the status of the battery 110 as checked-in and keep the battery(s) 110 secured to the central charging station 105 via the locking mechanism(s) 216. The user profile index 403 may issue a hold, for example, when the user profile has an unpaid/outstanding charge, is at a maximum limit as to how many batteries 110 may be checked-out under a user profile, and/or if the user associated with the user profile has failed to return a battery 110.

The notification management module 404 is configured to inform an operator of the central charging station 105 as well as the one or more users of the batteries 110 via the graphical user interface information regarding the central charging station 105 and/or the batteries 110. As described above, the graphical user interface may be generated on a display 212 of the central charging station 105 and/or, in some embodiments, the display of a remote electronic device (for example, a cellular telephone, a smart watch, a tablet computer, a personal digital assistant (PDA), or any other electronic device, or a combination of the foregoing associated with the operator/a user currently assigned a battery 110).

The notification management module 404 provides information to the operator of the central charging station 105 regarding the central charging station 105 and the batteries 110 associated with the charging station 105. The information about the central charging station 105 includes, for example, the batteries 110 that are currently checked-out and the batteries 110 that are currently checked-in and coupled to the central charging station 105, a status of charge and location of the batteries 110 (both coupled to the central charging station 105 and presently checked-out), and the like. In some embodiments, the notification management module 404 is configured to inform the operator of which batteries 110 are checked-out by which user profiles. In further embodiments, the notification management module 404 is configured to inform the operator when an identifier of a battery 110 received by the central charging station 105 does not match any of the identifiers stored in the battery index module 406.

The notification management module 404 also manages informing users of the information and/or characteristics of one or more batteries 110. For example, the notification management module 404 may be configured to generate notifications to a user of the battery 110 regarding the battery 110 they currently have checked-out. Such notifications could include, for example, to return the battery 110 to the charging station 105 or a bill for the use of the battery 110 upon returning the battery 110 to the charging station 105. The notification management module 404 is also configured to generate alerts to the user regarding the battery 110. For example, the alert may be a warning that the battery 110 has been determined to be malfunctioning or that, as described in more detail below, that the battery 110 has left the virtual boundary. In some embodiments, the notification management module 404 is further configured to notify a second charging station when information regarding a battery 110 not associated with the charging station 105 is received by the charging station 105. In some embodiments, the notification may relate to a charge level of the battery 110 (for example, that a battery 110 has a charge level below a predetermined threshold).

The battery index module 406 includes information regarding each of the batteries 110 associated with the charging station 105. The battery index module 406 includes an index of the profiles of the batteries 110 associated with the charging station 105, each profile including the unique identifier of the battery 110. The battery index module 406 may also store a maintenance record of the battery 110 (for example, history of any detected malfunctions), a location history of the battery 110, a user history of the battery 110 (including previous usage costs), as well as other additional information relevant to the battery 110. In some embodiments, a profile of a battery 110 may be added and/or removed from the index of batteries 110 associated with the charging station 105.

The location/status management module 408 is configured to monitor the status of and track the location of the one or more batteries 110 associated with central charging station 105. Specifically, the location/status management module 408 determines the location of the batteries 110 associated with the charging station 105 as well as collects characteristic information related to the batteries 110. For example, the location/status management module 408 may monitor at least one characteristic of the battery 110 when the module is checked-out. The characteristic(s) may include, for example, an electric characteristic of the battery 110 (for example, a charge level), a thermal characteristic of the battery 110, a location of the battery 110, and an identity (or identities) of the load device(s) 115 coupled to the battery 110 (for example, a load device type, a manufacture identity, a model number, and the like). The characteristic information is received from the battery 110 over time while the battery 110 is checked-out by the central charging station 105 or the database 106 and is accordingly stored in the database 106. In some embodiments, while the battery 110 is being monitored while checked-out, the location/status management module 408 may be further configured to determine when the charge level of the battery 110 falls below a predetermined charge threshold. In response to the charge level falling below the charge threshold, the central charging station 105 may wirelessly charge the battery 110 when the battery 110 is within a predetermined charging range of the central charging station 105.

In some embodiments, the location/status management module 408 may determine when the battery 110 exits the virtual boundary or geofence associated with the central charging station 105. The location of the batteries 110 may be determined via proximity sensors (not illustrated) or radio frequency communication, for example Bluetooth or radio frequency identification (RFID). In some embodiments, the batteries 110 are tracked by the battery management platform 400 using, among other things, satellite navigation tracking (e.g., global navigation satellite system (GNSS) tracking, global positioning system (GPS) tracking, Galileo tracking, Indian Regional Navigation Satellite System (IRNSS) tracking, GLObal NAvigation System (GLONAS) tracking, BeiDou Navigation Satellite System, etc.) and WiFi-based tracking. In some embodiments, the batteries 110 transmit information regarding their location to the central charging station 105.

In some embodiments, the battery 110 is configured to periodically determine an approximate distance the battery 110 is from the central charging station 105. For example, the battery 110 may periodically ping the central charging station 105 and use the information to approximate the distance of the battery 110 from the central charging station 105. In further embodiments, the battery 110 may use the approximate distance to determine when the battery 110 is outside the virtual boundary. The battery 110 may then provide a visual/audible indication to the user to notify that they are outside the virtual boundary and/or notify the central charging station 105 that the battery 110 is outside the virtual boundary. In some embodiments, the battery 110 is configured to cease providing power/charging the load device(s) 115 when the battery 110 determines that the battery 110 is outside the virtual boundary. The battery 110 may continue to approximate the distance from the central charging station 105 and continue providing power/charging the load device(s) 115 when the battery 110 determines that the battery 110 is within the virtual boundary again. In further embodiments, the battery 110 is configured to stop powering/charging the load device(s) 115 and/or shut off after failing to receive a response from the charging station 105 after sending one or more ping requests.

In some embodiments, when a battery 110 that have been checked-out is returned to the central charging station 105, the location/status management module 408 may be configured to evaluate the at least one characteristic of the battery 110 to determine the amount of charge used by a user of the battery 110 while the battery 110 was checked-out. The amount of charge used may be used by the check-in/check-out management module 402 to determine the usage cost. The location/status management module 408 may also use the at least one characteristic of the battery 110 to troubleshoot the battery 110 to determine a potential malfunction.

Figure 5:
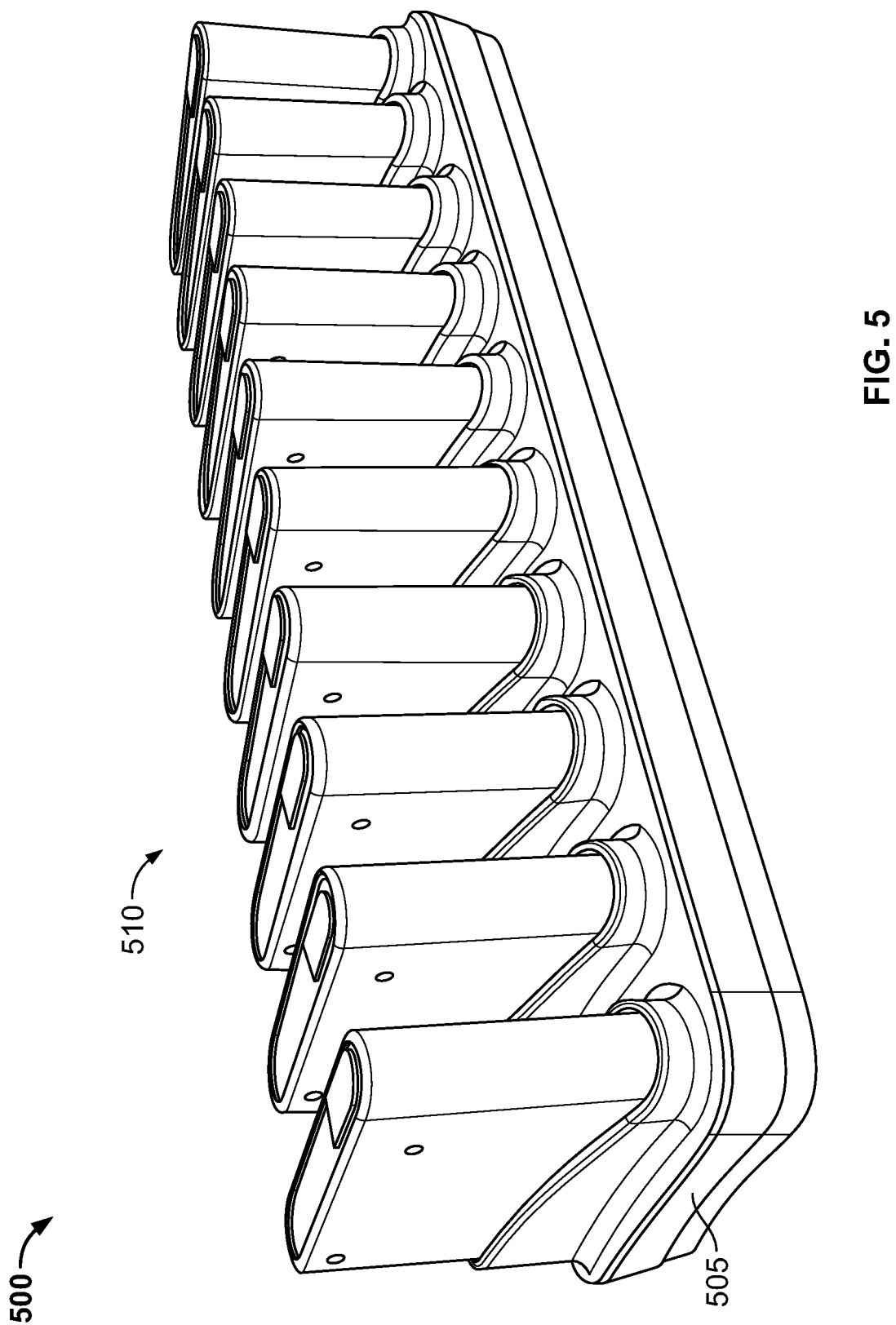
FIG. 5 is a perspective view of a central charging station according to some embodiments.

FIG. 5 illustrates a battery management and charging system 500 according to some embodiments. The system 500 includes a central charging station 505 and one or more batteries 510. In some embodiments, the central charging station 505 and the one or more batteries 510 include similar components to central charging station 105 and batteries 110, respectively.

The central charging station 505 includes one or more battery receptacles configured to receive one or more batteries 510. In some embodiments, the station 505 may lock/unlock each battery 510 located in the one or more battery receptacles.

In operation, the central charging station 505 is configured to receive, charge, and/or identify individual batteries 510. In some embodiments, the station 505 charges the batteries 510 using a proprietary charging apparatus. Additionally, in some embodiments, the station 505 identifies the respective batteries 510 using an identification operation (for example, radio-frequency identification (RFID), barcode/QR scanning, etc.).

In some embodiments, the central charging station 505 is communicatively coupled to a network (for example, a cloud-based network, a cloud-based controller, a remote controller, etc.). In such an embodiment, the station 505 communicates the location of each battery 510 (for example, located at the station 505 or located outside the station 505), the charge level of each battery 510, and/or any diagnostics concerning the station 505 and/or batteries 510.

Figure 6:
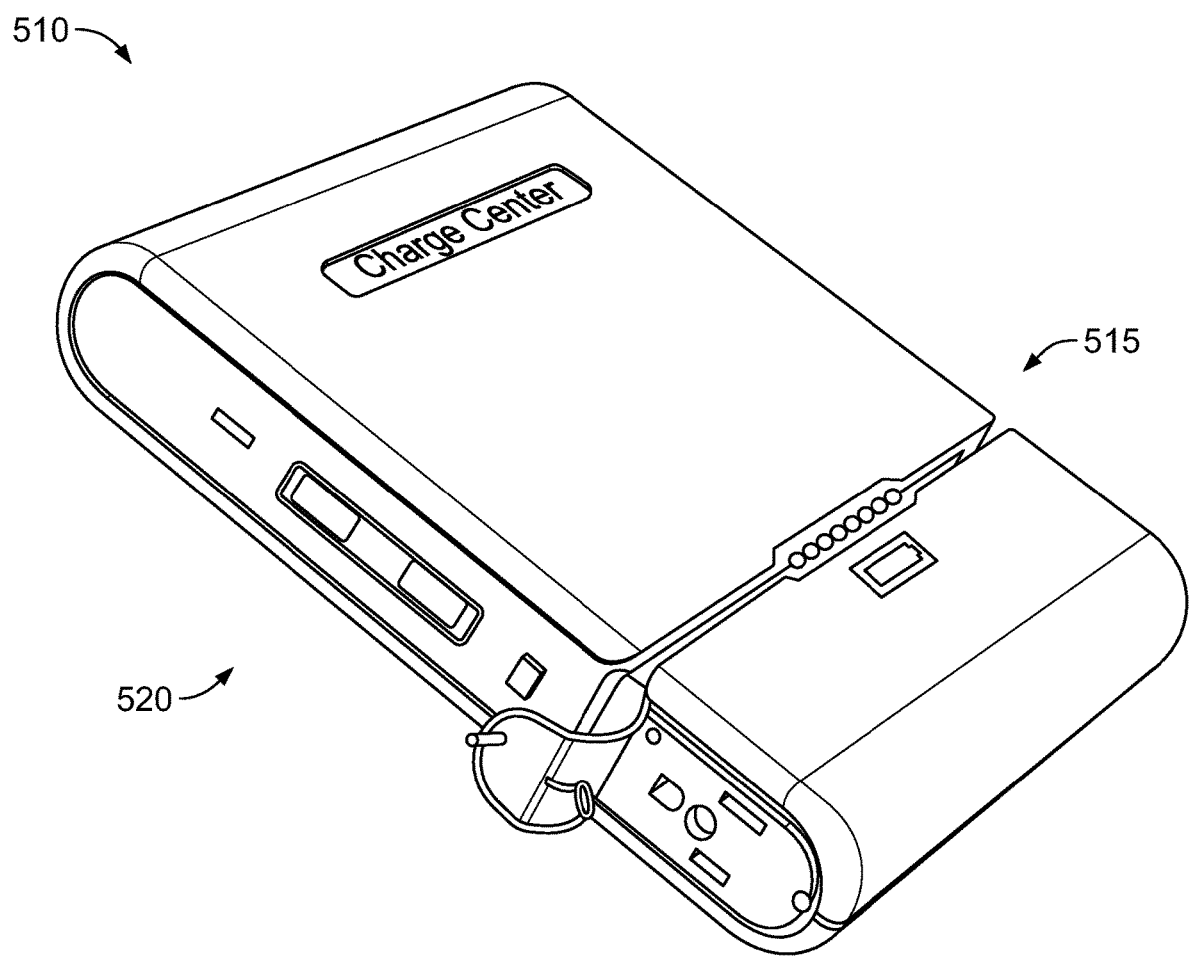
FIG. 6 is a perspective view of a battery according to some embodiments.

FIG. 6 is a perspective view of the battery 510 according to some embodiments. The battery 510 includes a housing containing one or more batteries. In some embodiments, the batteries are rechargeable batteries (for example, batteries having a rechargeable alkaline chemistry, a nickel-cadmium chemistry, a lithium-ion chemistry, etc.). In the illustrated embodiment, the battery 510 further includes an indicator 515. The indicator 515 may be configured to indicate a charge level of the battery 510 to a user.

The battery 510 may further include one or more outputs 520. The one or more outputs 520 may be configured to output power from the one or more batteries to an external device. The one or more outputs 520 may include an alternating-current (AC) output and/or a direct-current (DC) output. For example, in some embodiments, the battery 510 may include a duplex AC outlet and/or a universal serial bus (USB) outlet.

Figure 7:
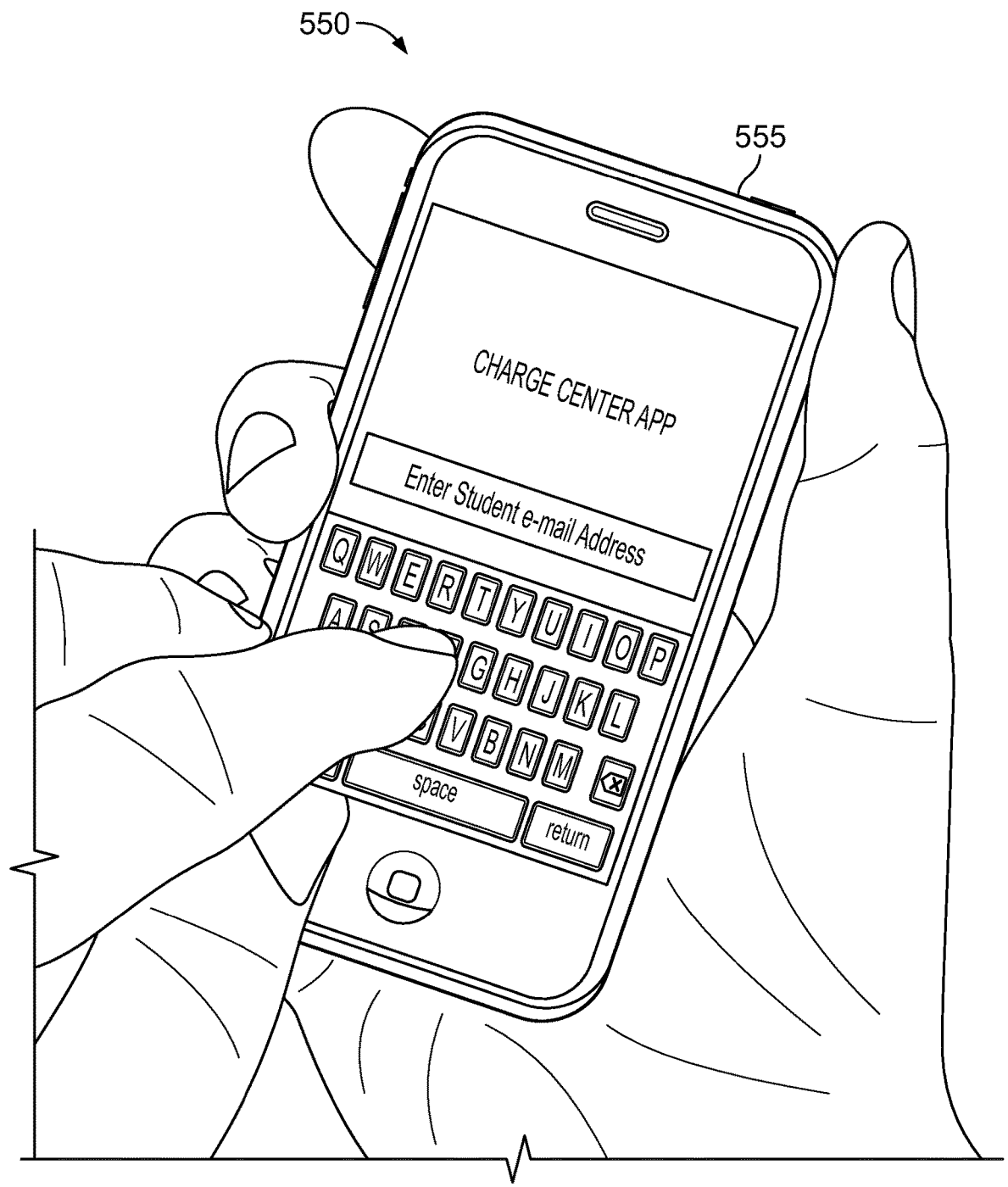
FIG. 7 is a view of an application of a battery management and charging system according to some embodiments.

FIG. 7 illustrates a program, or application, 550 used to "check-out" a battery 510 from the center 505. In operation, a user downloads the application 550 to a device 555 (for example, a smart phone, a tablet, a laptop, etc.). The user enters any relative information (for example, their contact information). The user may then enter their location, and/or use location services of the device 555.

Figure 8:
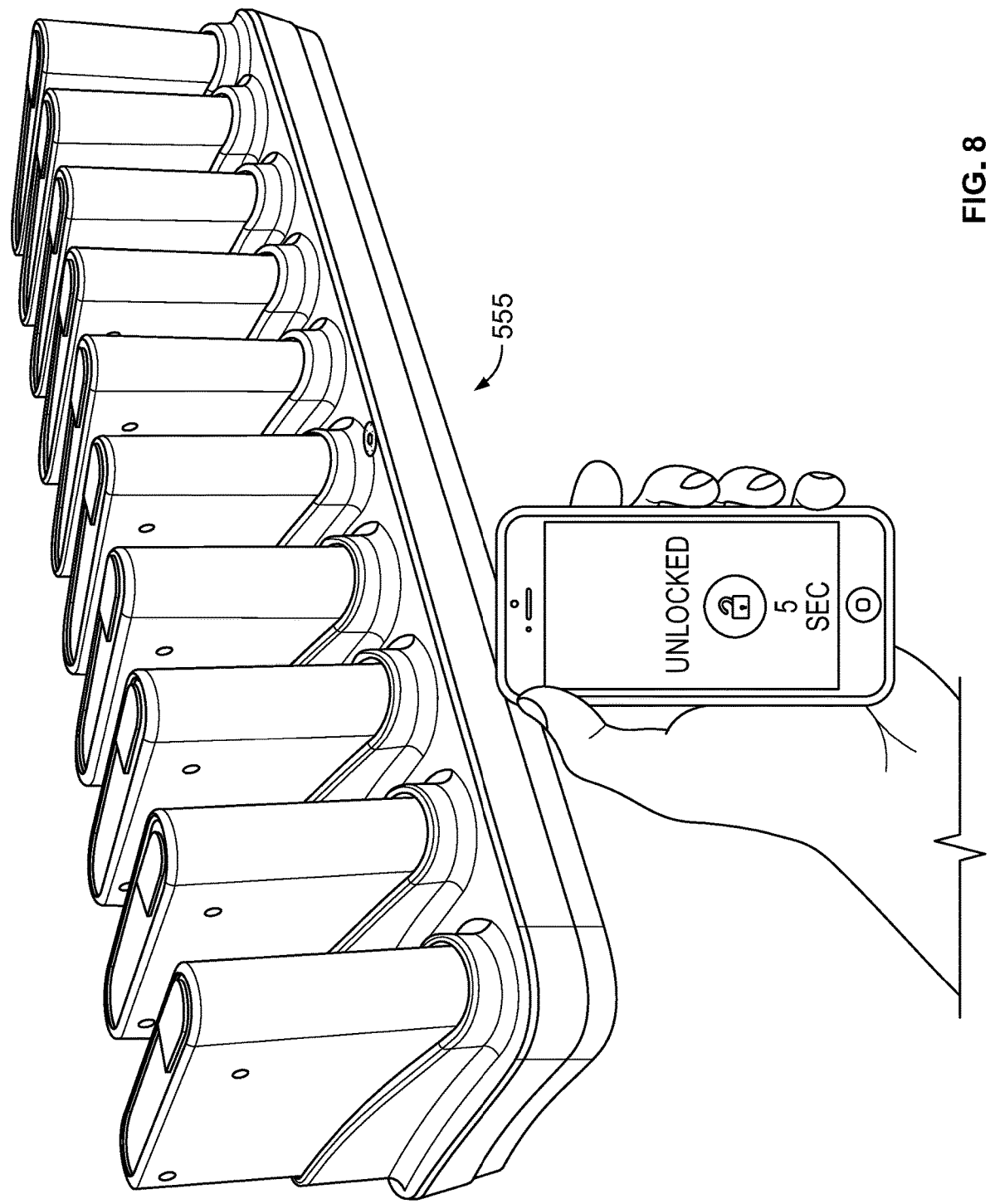
FIG. 8 is a battery management and charging system according to some embodiments.

As illustrated in FIG. 8, the center 505 may receive (via the network) notification that a battery 510 is to be removed by a user. The center 505 may then unlock the battery 510 and illuminate an indicator 560 of the center 505 directing the user to the unlocked battery 510. The user may then remove and use the battery 510. The center 505 stores in memory, and/or communicates with the network, that the respective battery 510 has been removed. In some embodiments, the center 505 and/or the network may record a time stamp of the battery 510

Upon completion of use of the battery 510 (for example, after the charge level has decreased below a predetermined threshold and/or a predetermined time has elapsed) the user may then return the battery 510 to the center 505. Once returned, the center 505 may once again lock the battery 510. The center 505 may further record in memory, and/or communicate with the network, that the respective battery 510 has been returned.

When the battery 510 is not returned upon completion (for example, after the charge level has decreased below a predetermined threshold and/or a predetermined time has elapsed), the user (via the center 505, the network, and/or the application 550) may be notified that the battery 510 be returned. If the battery 510 is still not returned within a second predetermined time, the user may be prohibited from using any further batteries 510, charged via charge information (for example, credit card, debit card, online pay system, etc.), and/or an institution associated with the user (for example, a university, a business, etc.) may be notified that user has not returned the battery 510 upon completion.

Figure 9:
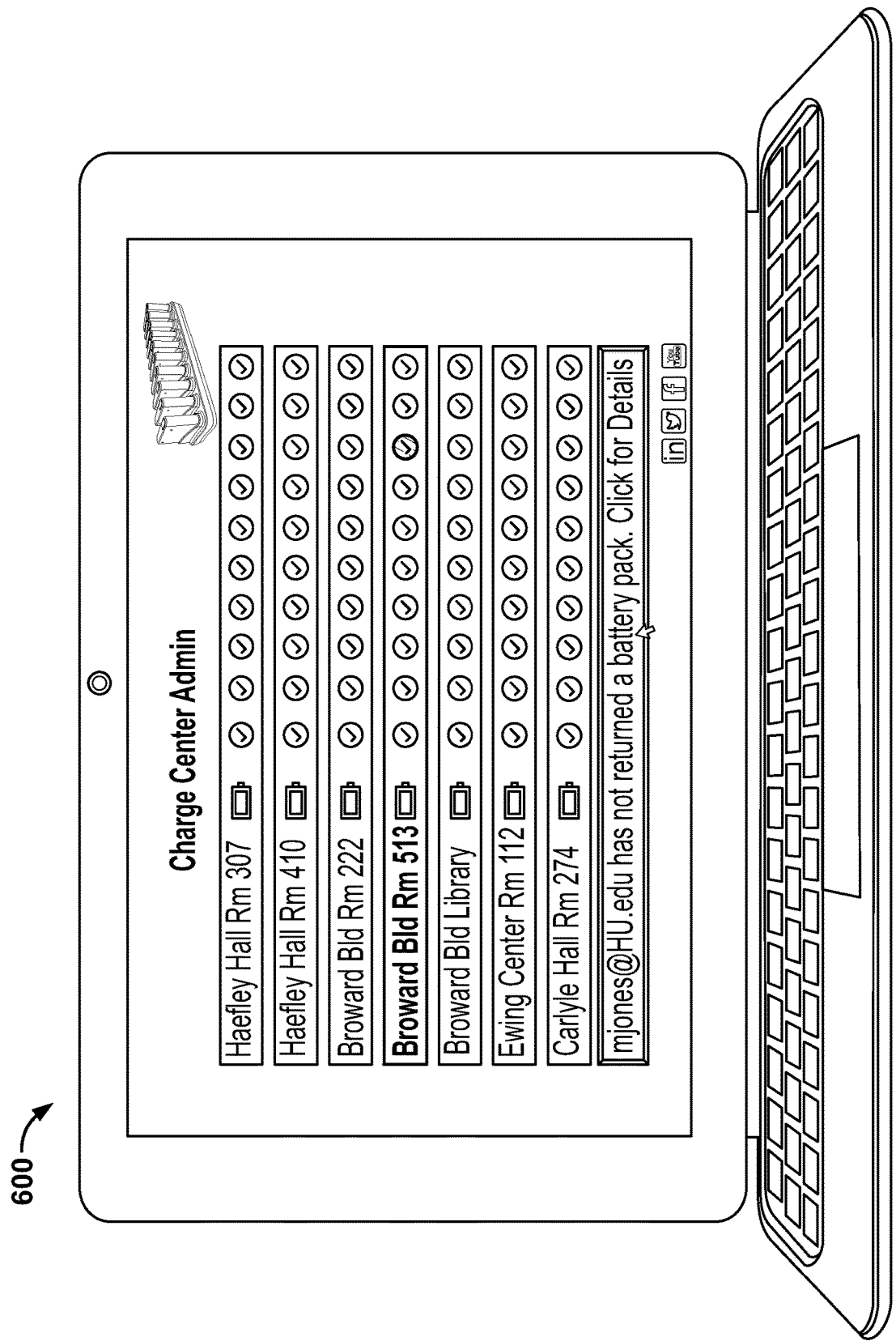
FIG. 9 is a view of an application of a battery management and charging system according to some embodiments.

FIG. 9 illustrates an administrator program, or application, 600 according to some embodiments. The administrator application 600 may be used to track one or more batteries 510. For example, the application 600 may be used by an administrator to determine the charge level of each battery 510, if a respective battery 510 has been checked-out, who has a respective module 510 checked-out, a check-out history of each module 510, and/or a diagnostic report of each module 510.

Figure 10:
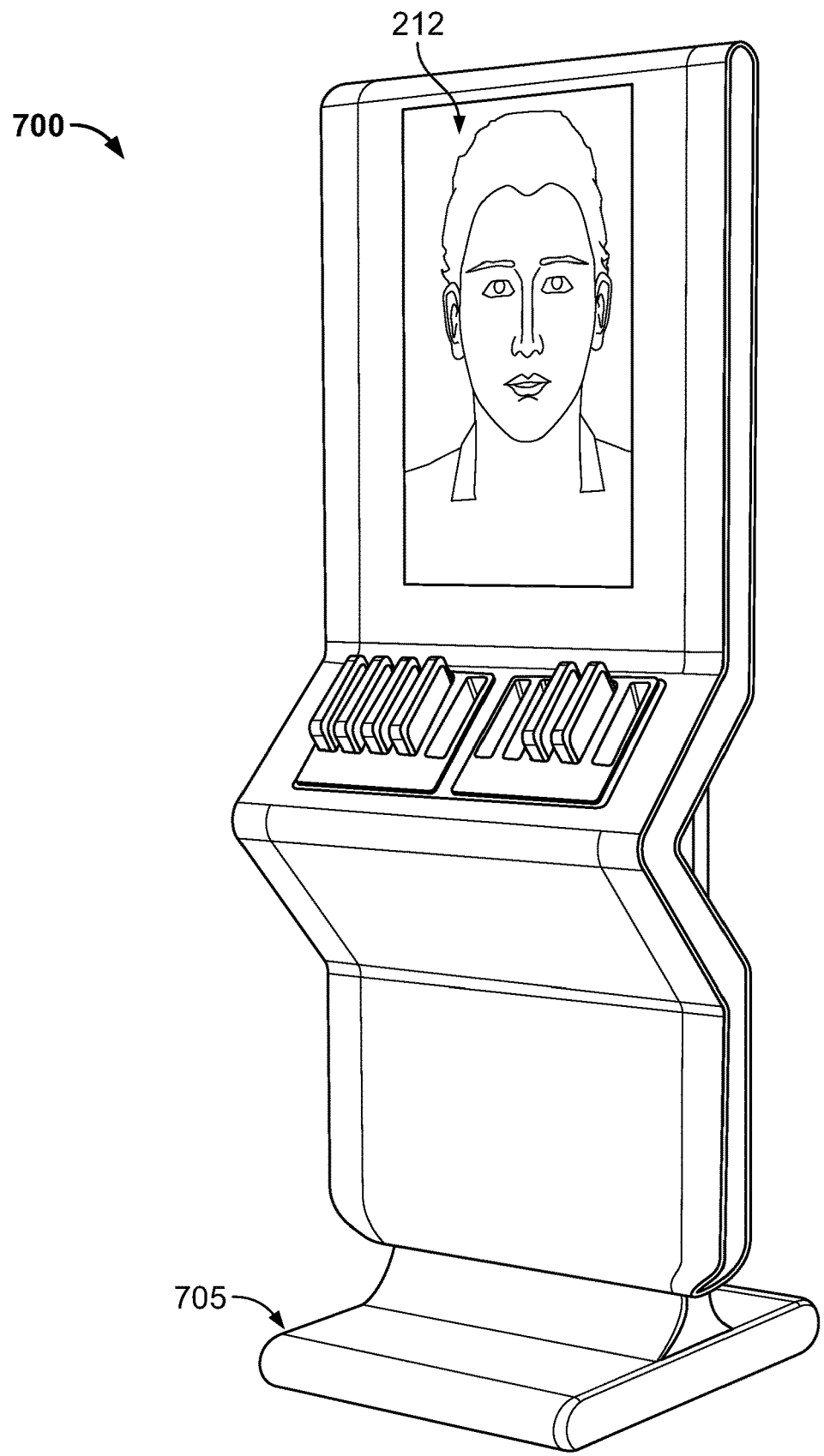
FIG. 10 is a perspective view of a charge center according to some embodiments.
Figure 11:
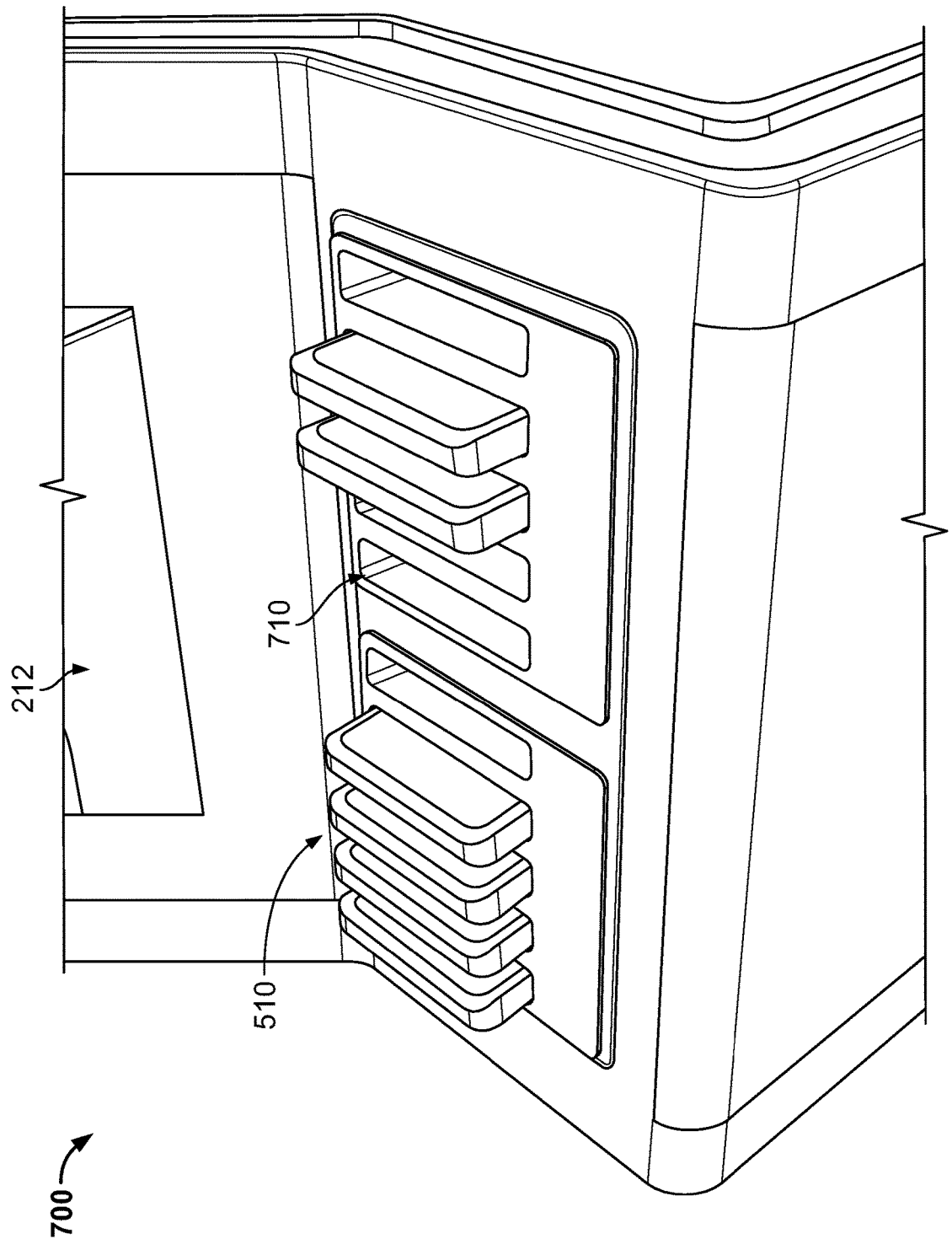
FIG. 11 is an enlarged view of the charge center of FIG. 10 according to some embodiments.

FIGS. 10 and 11 illustrate a charge center 700 according to some embodiments. As illustrated, charge center 700 may include a base 705, one or more battery receptacles 710 configured to receive one or more battery 510, and a display 212. As discussed above, a user may request a battery 510 via a graphical user interface of the display 212.

In some embodiments, the charge center 700 is associated with an organization (for example, a business, school, store, etc.). In such an embodiment, the charge center 700 may display, via display 212, information associated with the organization, such as but not limited to, advertisements, schedules, and other various information.

Figure 12:
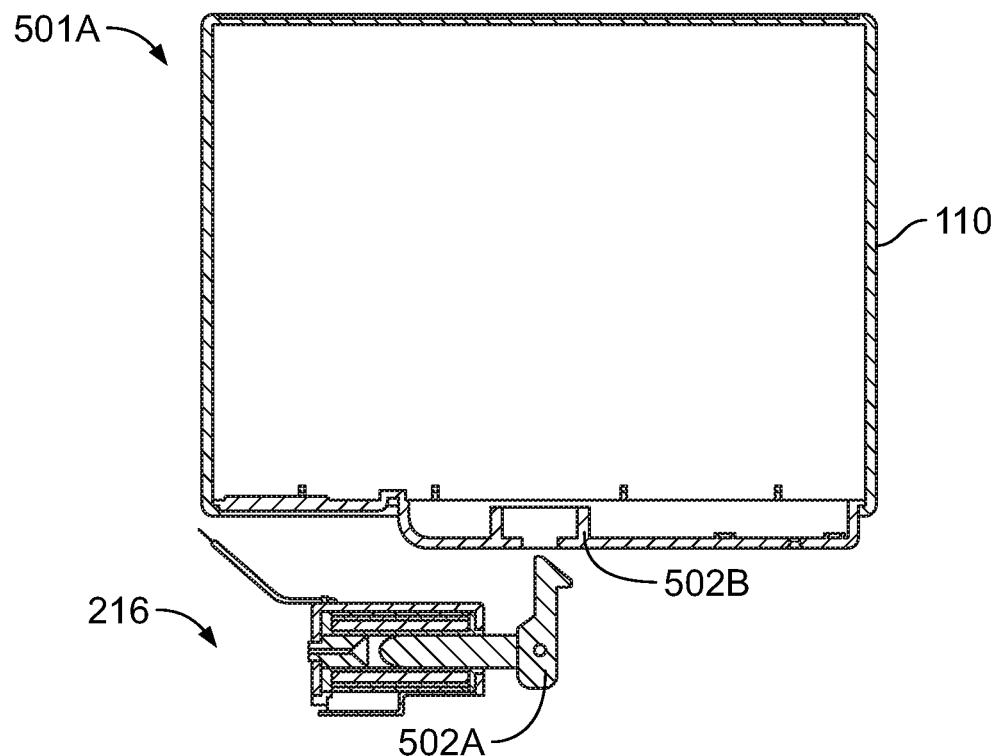
FIG. 12 is a side cutaway view illustrating a locking mechanism of the battery of FIG. 3 according to some embodiments.
Figure 12:
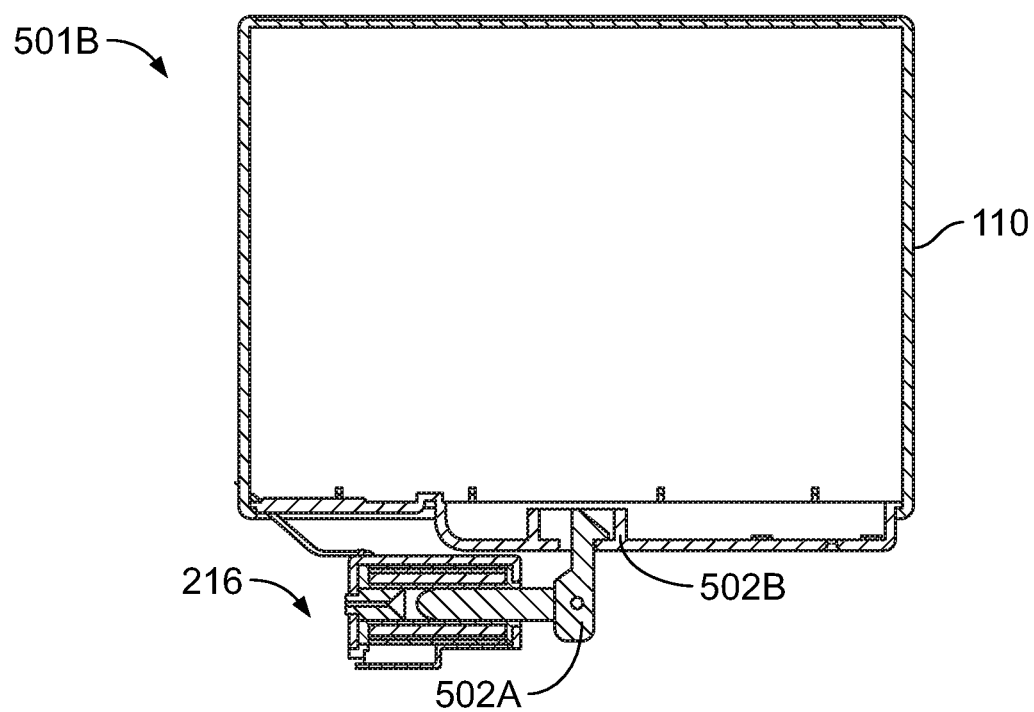

FIG. 12 is a side cutaway view illustrating an exemplary embodiment of the locking mechanism 216 with the battery module 110. The locking mechanism 216 includes a locking member 502A configured to engage with a receiver cavity 502B of the battery module 110. When in an unlocked position 501A, the locking member 502A is not engaged with the receiver cavity 502B, allowing the battery module 110 to be removed from the central charging station 105. When in a locked position 501B, the locking member 502A is engaged with the receiver cavity 502B so that the battery module 110 is secured and not removable from the central charging station 105. It should be understood that the locking mechanism 216 may utilize other kinds of locking/latching configurations besides the illustrated embodiment. In some embodiments, the battery module 110 includes the locking member 502A while the central charging station 105 includes the receiver cavity 502B.

The locking mechanisms 216 may be configured to be electronically locked, where the locking mechanism 216 is operated (locked and unlocked) electronically or remotely (for example, "smart locked"). When the locking mechanisms 216 are configured to be electronically locked, they may be operated via electronic commands from a user interaction through the graphic user interface on the display 212, an input device of the input and output interface 206, and/or an electronic command from a remote device (for example, a smart phone, tablet, computer, or other personal electronic device) received via the transceiver 208. In some embodiments, the locking mechanisms 216 may be configured to be physically engaged (required to be manually locked and unlocked via a key, a turn of a knob, or the activation of a user-actuable device in order to be operated). In some embodiments the locking mechanism 216 may utilize more than one kind of locking/latching configuration. For example, in some embodiments, the locking mechanism 216 may be configured to both physically and electronically lock, wherein, when the locking mechanism 216 is configured to override/bypass the electronic lock when physically engaged, allowing a user to unlatch one or more of the battery modules 110 without an electronic command.

In the foregoing specification, specific embodiments have been described. However, one of ordinary skill in the art appreciates that various modifications and changes can be made without departing from the scope of the application as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The application is defined solely by the appended claims including any amendments made during the pendency of this application and all equivalents of those claims as issued.

Moreover in this document, relational terms for example first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") for example microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Thus, the application provides, among other things, a system and method of device charging. Various features and advantages of the application are set forth in the following claims. Additional features may be disclosed in the attached Appendix.

What is claimed is:

1. A battery management platform comprising:
    a battery configured to supply a type of power to at least one load device;
    a central charging station configured to provide power to charge the battery while the battery is coupled to the central charging station, the central charging station including an electronic processor configured to:
        secure the battery to the central charging station via a locking mechanism when a status of the battery is determined to be checked-in, wherein the locking mechanism includes a locking member configured to engage with a receiver cavity of the battery;
        receive, via a graphic user interface, a user request to check-out the battery;
        update, in a memory, a status of the battery as checked-out;
        disengage, when the status is changed to checked-out, the locking mechanism to allow the battery to be removed;
        monitor at least one characteristic of the battery;
        determine, when the status is checked-out, when the battery is recoupled to the central charging station;
        update, in the memory, the status of the battery as checked-in; and
        engage, when the status is changed to checked-in, the locking mechanism to secure the battery to the central charging station;
    wherein the locking mechanism includes an override function configured to allow the user to disengage the locking mechanism without an electronic command.

2. The battery management platform of claim 1, wherein the electronic processor is further configured to
    determine, in response to the user request, a user profile associated with the user request;
    determine if there is a hold on the user profile;
    associate, when there is no hold on the user profile, an identifier of the battery with the user profile; and
    update the status of the battery to checked-out when there is no hold on the user profile.

3. The battery management platform of claim 2, wherein the electronic processor is further configured to, when the hold is on the user profile, maintain the status of the battery as checked-in.

4. The battery management platform of claim 1, wherein the at least one characteristic of the battery includes at least one selected from the group consisting of an electric characteristic of the battery, a location of the battery, a thermal characteristic of the battery, and an identity of the load device coupled to the battery.

5. The battery management platform of claim 4, wherein the electronic processor is configured to
determine, based on the at least one characteristic, when a charge level of the battery falls below a threshold; and
when the charge level falls below the threshold, wirelessly charge the battery while the battery is within a predetermined charging range of the central charging station.

6. The battery management platform of claim 4, wherein the electronic processor is further configured to, when the status of the battery is changed to checked-in, evaluate the at least one characteristic of the battery to determine at least one selected from the group consisting of a usage cost, an indication of potential malfunction, and a load device history of the battery.

7. The battery management platform of claim 1, wherein the electronic processor is further configured to
define a virtual boundary;
determine, based the location of the battery, whether the battery is within the virtual boundary; and
transmit a command to the battery causing the battery to stop supplying power to the load device when the battery is not within the virtual boundary.

8. The battery management platform of claim 1, wherein the electronic processor is configured to update the status to checked-in based on a reading from a battery sensor.

9. A battery management system comprising:
a battery center including one or more battery receptacle, the battery center configured to:
receive one or more batteries,
identify one or more batteries, and
charge one or more batteries; and
a controller including a memory and an electronic processor, the controller configured to:
receive, from the battery center, a status of one or more batteries,
receive, from a user, an unlock request, and
output, to the battery center, an unlock command;
wherein, the battery center unlocks, via a locking mechanism, one or more batteries from the one or more battery receptacles upon receiving the unlock command, wherein the locking mechanism includes one or more locking members configured to engage with one or more receiver cavities of the one or more batteries, and wherein the locking mechanism includes an override function configured to allow the user to disengage the locking mechanism without an electronic command.

10. The battery management system of claim 9, wherein the status of the one or more batteries includes at least one selected from the group consisting of a charge level, a location, and an operational status.

11. The battery management system of claim 9, wherein the controller receives the unlock request via an application of an external device.

12. The battery management system of claim 9, wherein the battery center outputs a signal to the controller indicative of one or more batteries being removed from the one or more battery receptacles.

13. The battery management system of claim 9, wherein prior to outputting the unlock command, the controller is configured to verify the user.

14. The battery management system of claim 9, wherein the battery center further includes a display.

15. The battery management system of claim 14, wherein the display includes a graphical user interface configured to receive the unlock request from the user.

16. The battery management system of claim 14, wherein the display is configured to display one or more advertisements.

17. The battery management system of claim 14, wherein the display is configured to display information associated with an organization.

* * * * *